(12) United States Patent
Mignan et al.

(10) Patent No.: US 12,488,704 B2
(45) Date of Patent: Dec. 2, 2025

(54) SYSTEM FOR SIMULATING A SURGICAL PROCEDURE

(71) Applicant: VIRTUALISURG, Neuilly-sur-seine (FR)

(72) Inventors: Nicolas Mignan, Neuilly-sur-seine (FR); Erwan Jolivet, Neuilly-sur-seine (FR)

(73) Assignee: VIRTUALISURG, Neuilly-sur-Seine (FR)

( * ) Notice: Subject to any disclaimer, the term of this patent is extended or adjusted under 35 U.S.C. 154(b) by 1316 days.

(21) Appl. No.: 16/762,629

(22) PCT Filed: Nov. 9, 2018

(86) PCT No.: PCT/FR2018/052799
§ 371 (c)(1),
(2) Date: May 8, 2020

(87) PCT Pub. No.: WO2019/092382
PCT Pub. Date: May 16, 2019

(65) Prior Publication Data
US 2020/0279506 A1    Sep. 3, 2020

(30) Foreign Application Priority Data
Nov. 10, 2017  (FR) .................................... 1760601

(51) Int. Cl.
*G09B 23/28*  (2006.01)
(52) U.S. Cl.
CPC ................................ *G09B 23/285* (2013.01)

(58) Field of Classification Search
None
See application file for complete search history.

(56) References Cited

U.S. PATENT DOCUMENTS

| 2009/0176196 A1* | 7/2009 | Niblock | G09B 23/285 434/262 |
| 2009/0263775 A1* | 10/2009 | Ullrich | G09B 23/285 434/267 |
| 2014/0051049 A1* | 2/2014 | Jarc | G09B 23/285 434/267 |
| 2014/0342334 A1* | 11/2014 | Black | G09B 23/30 434/269 |

(Continued)

FOREIGN PATENT DOCUMENTS

| EP | 0 935 796 B1 | 8/2007 |
| EP | 2 068 295 A2 | 6/2009 |

(Continued)

OTHER PUBLICATIONS

International Search Report issued on Feb. 4, 2019 in corresponding International application No. PCT/FR2018/052799; 4 pages.

*Primary Examiner* — James B Hull
(74) *Attorney, Agent, or Firm* — Maier & Maier, PLLC

(57) ABSTRACT

A training device for performing a surgical procedure, which includes an enclosure having at least: one first surface defining an operation interface intended to receive at least one surgical tool; at least one opening arranged on the first surface; and a connection interface maintained at the circumference of the opening; the connection interface being suitable for receiving and supporting a sheath.

10 Claims, 7 Drawing Sheets

(56) References Cited

U.S. PATENT DOCUMENTS

| | | | | |
|---|---|---|---|---|
| 2015/0187229 A1* | 7/2015 | Wachli | ............... | G09B 23/30 |
| | | | | 434/272 |
| 2016/0098943 A1* | 4/2016 | Valeev | ............... | G09B 23/30 |
| | | | | 434/267 |
| 2016/0133158 A1 | 5/2016 | Sui et al. | | |
| 2016/0365007 A1* | 12/2016 | Black | ............... | G09B 23/281 |
| 2017/0251900 A1 | 9/2017 | Hansen et al. | | |
| 2019/0206282 A1* | 7/2019 | Novokhatskiy | ........ | G09B 23/30 |

FOREIGN PATENT DOCUMENTS

| | | | | |
|---|---|---|---|---|
| WO | WO-2009136479 A1 * | 11/2009 | ....... | A61B 5/150022 |
| WO | 2017/059860 A1 | 4/2017 | | |
| WO | 2017/098036 A1 | 6/2017 | | |

\* cited by examiner

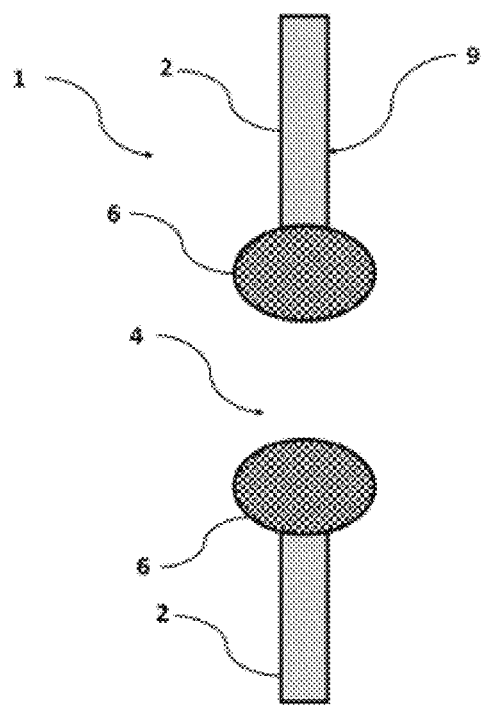
FIG. 2A
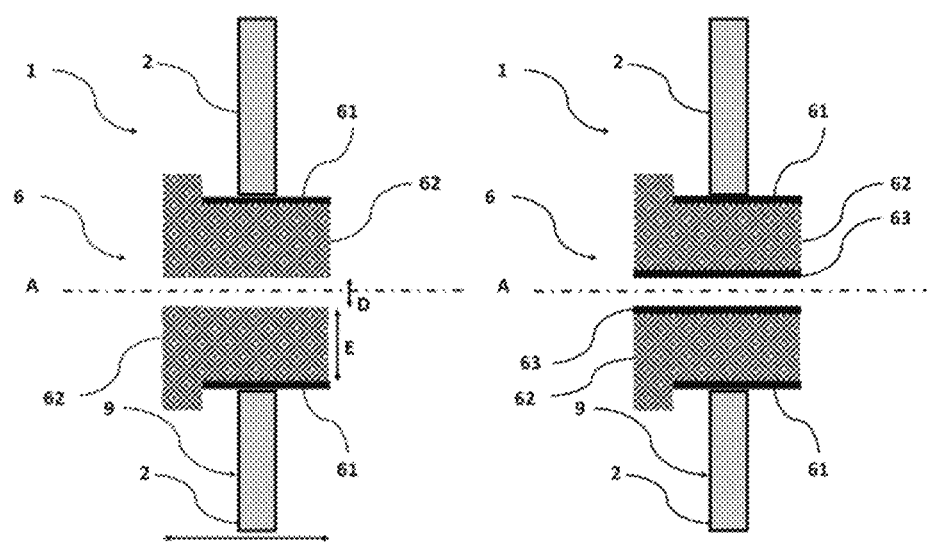
FIG. 2B                    FIG. 2C

SYSTEM FOR SIMULATING A SURGICAL PROCEDURE

FIELD

The present invention relates to a system for simulating a surgical procedure for the training of surgeons.

BACKGROUND

The learning of the surgeon profession is currently carried out through the theory, observation of practical cases then performance of the procedure on real patients under the surveillance of a more experienced surgeon.

It is necessary that the surgeon in training practices surgical procedures in order to become acquainted with a practice to be mastered. Yet, the surgeon profession requires rigour, precision and delicacy in order to prevent an incorrect manipulation of the tools. One problem is that in the presence of patients, an incorrect manipulation may lead to complications such as the piercing or the rupture of a blood vessel or of an organ. Said type of accidents often involves emergency treatment of the patient by an invasive and potentially dangerous surgery for the survival of the patient.

Therefore, it is important for the surgeon to be able to practice on practical surgical procedures without involving a patient.

Thus, there is a need to secure the operating phases and the practical learning phases in the training of surgeons for performing potentially dangerous manipulative exercises when they are carried out with a patient.

Surgery training methods exist via training simulators. For example, a trainee surgeon manipulates a joystick to interact with a virtual environment in order to simulate a surgical procedure. Systems of sensors of the position of hands also exist for controlling and guiding the surgical procedure simulation.

However, a first drawback is that the learner does not get the same sensory conditions as during an operation.

Document EP0935796 discloses a system intended to train persons to perform minimally invasive surgical procedures. Said device comprises a housing having openings for the insertion of a tool. Once inserted, the instrument may move in axial translation and in rotation. Said instrument is connected to a guiding system and a system of sensors inside the housing. The device also comprises a screen whereon is broadcast a video showing the body of a patient animated by a breathing cycle and a heartbeat. The screen superimposes on said video the position in the virtual world of the instrument of the surgeon.

Document US2016/133158 is also known, describing a training device comprising surgical instruments and a support structure configured to restrict the movement of the surgical instruments. The limitation of the movement of instruments in a volume mimics the limitation of movement encountered in minimally invasive surgery. Said document also discloses the generation of a virtual environment and the tracking of the movements of instruments in order to integrate a representation of said instruments into the virtual environment generated.

Document US2017/251900 also discloses a training device comprising a surface and a slot for accommodating a sheath. Said document discloses a camera system for reproducing the interior of the device on a screen.

A first drawback is that the sensations of the learner are not compatible with same felt by the surgeon in operation. Notably the freedom of movement of instruments and the interactions of said instruments with the body of the patient or of other medical devices are not representative of a real situation.

A second drawback is that said type of devices is only suitable for practicing on the performance of a very specific surgical procedure. Said drawback fundamentally results from the fact that, when a plurality of openings are envisaged in a surface of a housing belonging to such a device, these openings are arranged according to predetermined positions corresponding to areas of intervention specifically related to the pathology concerned. Consequently, in order to train the medical staff to intervene within the scope of another pathology, the housing must be replaced, which involves additional, often complex, and expensive manipulations.

Therefore, there is a need for a training device for performing a surgical procedure mimicking in an optimised manner the sensations perceived during a real surgical procedure and for simulating a plurality of surgical procedures.

SUMMARY

The present invention relates to a training device for performing a surgical procedure overcoming the drawbacks of the prior art.

Therefore, the invention relates to a training device for performing a surgical procedure. The invention also relates to a system for guiding a surgical procedure.

According to one aspect, the invention relates to a training device for performing a surgical procedure, characterised in that it comprises an enclosure comprising at least: one first surface defining an operation interface intended to receive at least one surgical tool, the remainder of the surface of the enclosure forming a base; an opening arranged on said first surface; and a connection interface maintained at the circumference of said opening; said connection interface being suitable for receiving and supporting a sheath.

Advantageously, the present invention makes it possible to reproduce surgical procedures, notably micro-invasive surgical procedures by mimicking in an optimised manner the sensations perceived during a real surgical procedure and by making it possible to simulate a plurality of surgical procedures.

In specific embodiments, the training device may further comprise one or more of the following features, taken alone or according to all possible technical combinations.

In one embodiment, the first surface includes a moveable portion in relation to the base, said opening being arranged on said moveable portion. Such a configuration of said first surface makes it possible to modify the placement of the opening positioned on the moveable portion.

Therefore, it is a particularly advantageous configuration since it makes it possible to reproduce in an optimised manner the position of the incisions intended to be made in connection with the surgical procedure concerned. Thus, it is possible to practice on a plurality of surgical procedures with the same device, whilst reproducing in an optimised manner the real conditions. The structure of the training device with the moveable portion also makes it possible for it to adapt to the morphology of each patient.

In one embodiment, the first surface includes another opening arranged on another portion of the first surface, separate from said moveable portion. Such a configuration of the first surface is advantageous because same makes it possible to increase the number of sheaths, and therefore ultimately the number of surgical tools likely to be introduced into the chamber.

In one embodiment, said other portion is integral with the base. Thus, according to said configuration, the modification of the gap between two openings results from a modification of the position of the single moveable portion. Such layouts make it possible to obtain a device of simple design requiring few manipulations in order to be adapted to a given surgical procedure.

In one alternative embodiment, said other portion is also moveable in relation to the base. Thus, according to said configuration, each opening is placed on a moveable portion, the moveable portions being separate from one another. Such layouts make it possible to increase the gap modification possibilities between two openings, notably when the amplitude of mobility of each moveable portion is reduced due to a congestion of the environment wherein is positioned the training device. The adaptability of the device to various morphologies of patients is also improved.

In one embodiment, the device includes at least one slide configured to engage with at least one moveable portion, so as to enable a translational movement of said at least one moveable portion.

In one embodiment, said connection interface comprises an elastomer, a foam, a silicone gel or a plastic material. In one embodiment, the connection interface comprises at least one element whereof the Young's modulus is between 0.002 MPa and 50 MPa.

In one embodiment, the enclosure comprises at least one guiding interface arranged close to at least one opening, said guiding interface providing a ball joint connection with a longitudinal portion of a sheath.

Advantageously, said embodiments make it possible to reproduce in an optimised manner the sensory feedback felt during a real situation in surgery, in particular in microinvasive surgery.

In one embodiment, the connection interface is the guiding interface. In one embodiment, the connection interface is removable.

In one embodiment, the training device further comprises a system for attaching said device to a support; and a means for adjusting the position of said device of the attachment system. Thus, the device is advantageously configured to be adaptable to a plurality of users and to be installed on various supports.

According to another aspect, the invention relates to a guiding system for the training of a surgical procedure characterised in that it includes: a training device according to the present invention, a first sheath including a hollow and longitudinal portion introduced into and maintained in one of the openings of said device and suitable for receiving a surgical tool, said first sheath providing a sliding pivot connection for the movement of said tool.

In one embodiment, said guiding system further comprises a second sheath including a hollow and longitudinal portion introduced into and maintained in a second opening of said device and suitable for receiving a surgical tool, said second sheath providing a sliding pivot connection for the movement of said tool.

In one embodiment, the at least one sheath comprises an elastic material layer placed on the inner surface of the longitudinal portion of said sheath.

In one embodiment, said guiding system further comprises a surgical tool including a lever; a shaft intended to be introduced into one of the openings or into a connection interface of the training device, a control interface; at least one orientation sensor and at least one positioning sensor of the surgical tool; and at least one communication interface for transmitting data collected by said sensors to a remote computer.

In one embodiment, said guiding system further comprises a sensor for activating the control interface or a sensor of a functional portion of said surgical tool generating a control indicator, said sensor being arranged on the surgical tool; a generator of an image of an area of a body of a patient on a display, said generator including a computer for determining on one hand the value of the control indicator and on the other hand orientations and positions of images to be displayed on a display depending on data received from the sensors arranged on the lever; and a video display displaying a reproduction of a portion of at least one surgical tool and of a movement relative to the activation thereof when the control indicator is generated and displaying the area of a body of a patient.

Thus, the guiding system makes it possible for the user to see a simulation of the portion of a human body to be operated on in the virtual world as well as a representation of the movement and of the activation of the surgical tools that same manipulates.

BRIEF DESCRIPTION OF THE FIGURES

The invention will be better understood upon reading the following description, given by non-limiting example, and made by referring to the following figures:

FIG. 2A is a sectional view of an opening.

FIG. 2B is a sectional view of an opening and of a removable connection interface.

FIG. 2C is a sectional view of an opening and of a removable connection interface comprising a rigid inner wall.

In said figures, identical references from one figure to another designate identical or similar elements. For reasons of clarity, the elements shown are not to scale, unless otherwise specified.

DETAILED DESCRIPTION

The invention relates to a training device, as well as a guiding system comprising said training device. In one embodiment, the device is intended to receive surgical tools in order to simulate a surgical procedure. In one embodiment, said surgical device and/or the surgical tools are connected to a processor for generating an interactive virtual reality also subsequently called "virtual world". In one embodiment, said interactive virtual reality simulates a portion of the body of a patient as well as the position of the surgical tools in said portion of the body.

The present invention aims to reproduce at the training device the sensations felt by the surgeon in real situations, in particular the exteroceptive sensations.

Figure 1A:
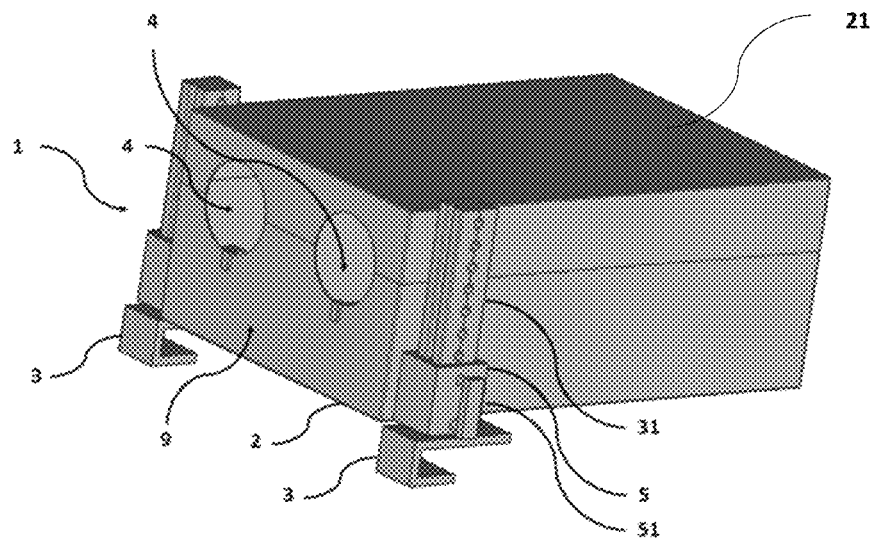
FIG. 1A is a view of the training device forming a closed enclosure.

"A surgical procedure" means the performance of at least one surgical action on a patient or a plurality of surgical actions. In one embodiment, "surgical procedure" also means a set of steps of a surgical procedure or the invasive or micro-invasive steps of a surgical procedure from the beginning to the end of a surgical operation. As illustrated in FIG. 1A, the training device 1 comprises an enclosure 2. In one embodiment, the enclosure 2 delimits a closed volume.

In one embodiment, the enclosure 2 comprises at least one first surface 9, the remainder of the surface of the enclosure 2 forming a base 21. Said first surface 9 defines an operation interface. In one embodiment, said first surface 9 comprises at least one or at least two openings 4. Said operation interface is therefore intended to receive at least one surgical tool through at least one of the openings 4 thereof.

In one embodiment, illustrated by way of non-limiting example in FIG. 1A, the first surface 9 is a flat surface. The base 21, for its part, is shaped so that the enclosure 2 has a total surface taking the shape of a rectangular parallelepiped.

In one embodiment, said openings 4 make it possible to simulate an incision of the patient in the virtual world. In one embodiment, the training device 1 comprises sensors for recording the positions, the movements and/or the states of the controls of a surgical tool inserted into an opening 4.

In one embodiment, said opening 4 is suitable for receiving and supporting a sheath 7. The sheath 7 makes it possible to simulate the presence of a trocar inserted into the skin of a patient. In one embodiment, said opening 4 comprises a connection interface 6 or is configured to receive a connection interface 6 suitable for receiving a sheath 7.

Figure 1B:
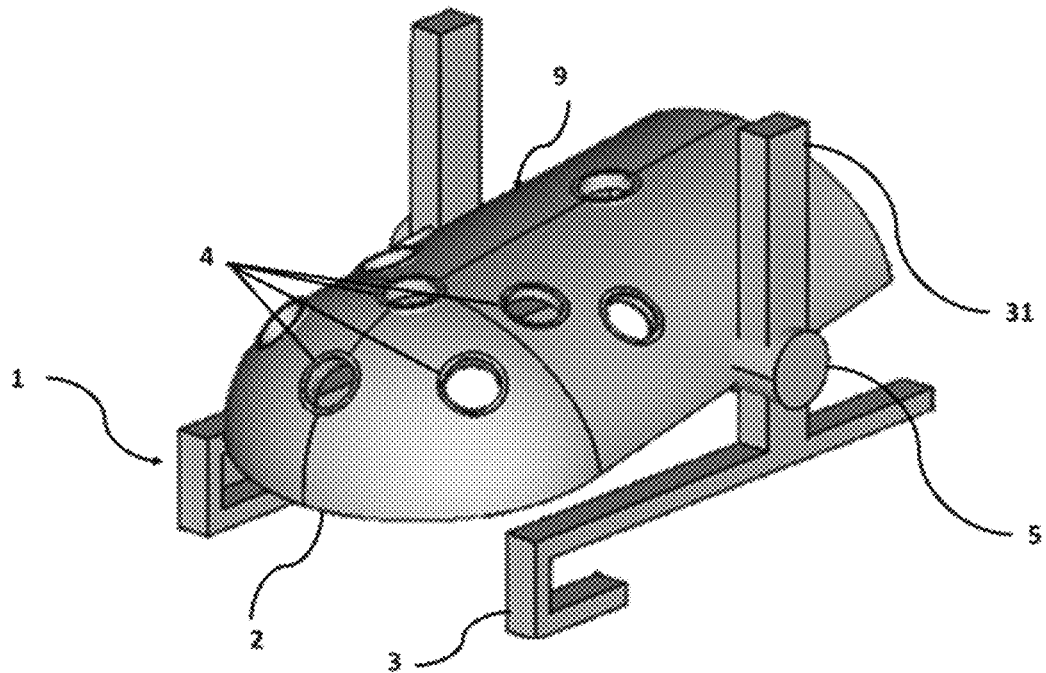
FIG. 1B is a view of the training device forming an open enclosure.
Figure 10:
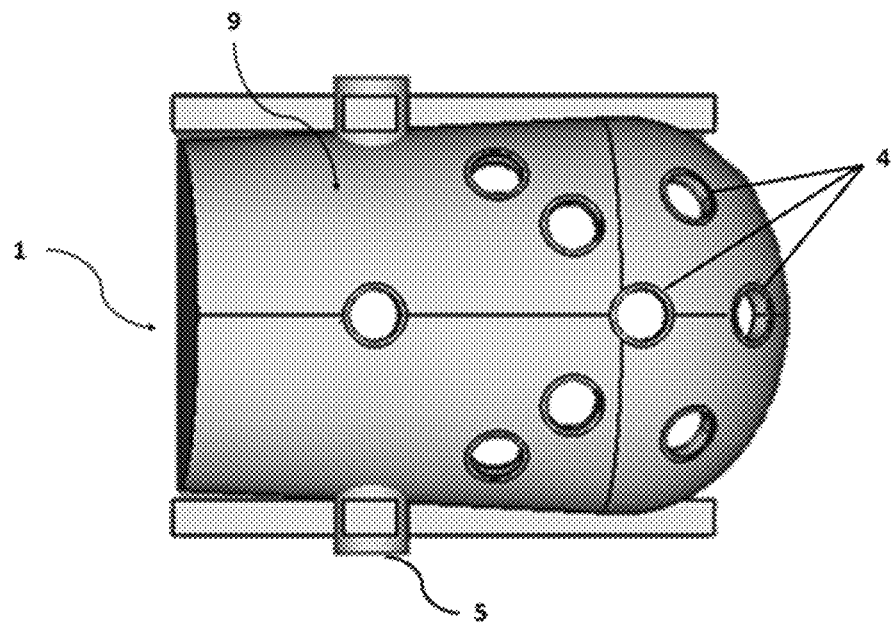
FIG. 10 is a view of the first surface of a training device comprising a plurality of openings.

In one embodiment illustrated in FIG. 1B and FIG. 10, the shape of the enclosure 2 or the shape of the first surface 9 corresponds to the shape of the abdomen of a patient. As illustrated in FIG. 1B, the enclosure 2 may be formed only by the first surface 9.

In one embodiment, the first surface 9 comprises at least one portion having a curve. In one embodiment, the curves of the first surface 9 are predefined for corresponding to the curves of the abdomen of a patient.

As illustrated in FIG. 2A, the opening 4 is a free space between the walls of the enclosure 2. In one embodiment, the device 1 comprises a connection interface 6 maintained at the circumference of said at least one opening 4. In one embodiment, the connection interface 6 has a hollow centre for the insertion of a sheath.

In one embodiment, said connection interface 6 comprises at least one flexible material. In one embodiment, said flexible material is representative of the rigidity or of the elasticity of the biological tissues of the patient of the area for inserting a sheath into the hollow centre of the connection interface 6.

In one embodiment illustrated in FIG. 2B, the connection interface 6 is removable and can be removed from the opening 4. In one embodiment, the opening 4 is cylindrical. In one embodiment, the opening 4 and the connection interface 6 comprise a flat section (not shown) for facilitating the insertion and/or the positioning of the connection interface 6 in the opening 4.

The advantage of the flat section is to stabilise the connection interface 6 in the opening 4, in particular when said opening 4 is located on a curved portion of the first surface 9 or on a portion of the first surface having an inclination with the horizontal. The stabilisation of the connection interface 6 in the opening 4 makes it possible at the same time to avoid interfering with the feeling of the user. Secondly, the stabilisation of the connection interface 6 also makes possible a more precise parallelism between the exact position of the opening 4 and the position of said opening 4 in the virtual representation.

Figure 3A:
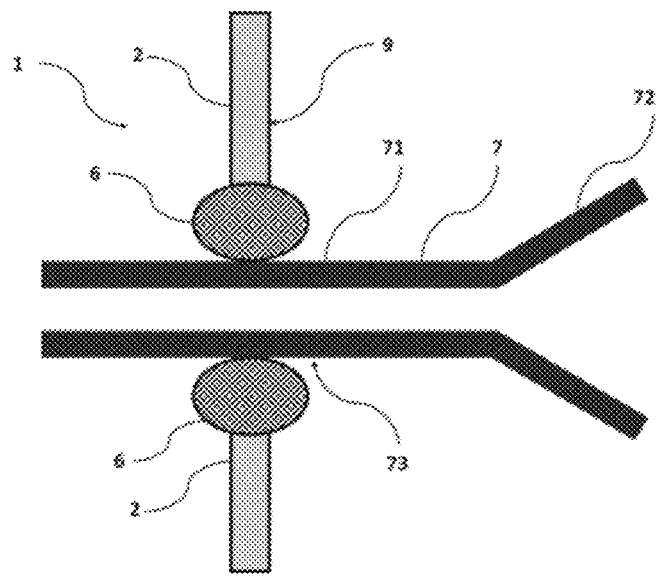
FIG. 3A is a sectional view of an opening wherein is inserted a sheath.
Figure 3B:
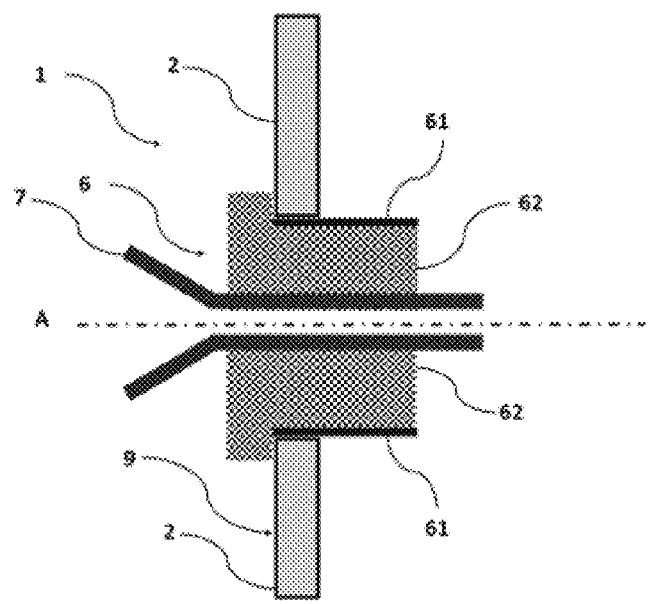
FIG. 3B is a sectional view of an opening and of a removable connection interface wherein is inserted a sheath.

In one embodiment illustrated in FIG. 2B and FIG. 3B, the connection interface 6 comprises a rigid outer wall 61. In one embodiment, said rigid outer wall 61 envelops the flexible material 62. The rigid outer wall 61 makes it possible to insert the connection interface 6 into the opening 4 of the first surface 9.

In one embodiment illustrated in FIG. 2C, the connection interface 6 also comprises a rigid inner wall 63. In one embodiment, the flexible material 62 is arranged between a rigid outer wall 61 and a rigid inner wall 63. In one embodiment, said two walls (61, 63) define a hollow cylinder.

The advantage of said rigid inner wall 63 is to facilitate the insertion of the sheath 7 into the connection interface 6.

Said advantage is increased when the diameter of the portion to be inserted of the sheath 7 is greater than the internal diameter (D) of the connection interface 6 the rigid inner wall 63 when the flexible material is at rest. In said scenario, the rigid inner wall 63 makes it possible to protect the flexible material 62 or to prevent the tearing of the flexible material 62 during the insertion of the sheath 7.

In one embodiment, the rigid inner wall 63 covers a portion of the circumference of the internal diameter of the flexible material 62 so as to enable the enlargement of the internal diameter (D) of the connection interface 6 by compression of the flexible material 62.

In one embodiment, the height (H) of the connection interface 6 corresponds substantially to the height of an abdominal wall. In one embodiment, the height of the connection interface 6 is between 1 cm and 15 cm. A connection interface 6 comprising a significant height, for example between 10 cm and 15 cm, makes it possible for example to simulate an operation on persons having a significant obesity.

In one embodiment, the hollow centre is cylindrical and has a diameter at rest (D) slightly less than the external diameter of the portion of the sheath to be inserted into the connection interface 6. "Diameter as rest" means the diameter when the flexible material is in the natural shape thereof or has not been subjected to any constraint.

In one embodiment, the flexible material 62 comprises an elastomer, a silicone gel, a foam or a plastic material. According to one example, said connection interface 6 comprises at least one portion having a Young's modulus between 0.002 and 50 MPa.

In one embodiment, the elastic properties of the flexible material are similar to the elastic properties of the skin. According to one example, said connection interface 6 comprises at least one portion having a Young's modulus between 0.002 and 15 MPa. Therefore, such an interval makes it possible to create a feeling, for the medical staff desiring to be trained, identical to same obtained during real surgical procedures made at the skin. This therefore makes it possible to target very precisely the feeling sought, which contributes to training the medical staff in an optimum manner for the surgical procedure concerned. In other words, targeting such an interval makes it possible to avoid confusing the sensations related to some of a surgical procedure on the skin with other sensations, such as for example same related to a surgical procedure carried out in deeper layers of the body, typically the veins, the nerves, the ligaments, etc. It is then understood that to have a flexible material in such an interval advantageously reduces the possible errors of manipulations during surgical procedures carried out in real conditions on subjects.

The choice of such an interval for the Young's modulus of the connection interface 6 only constitutes one alternative embodiment of the invention. Thus, nothing excludes having a different interval, so that the elastic properties of the flexible material 62 of the connection interface 6 be similar to the elastic properties of another portion of the body, such as for example the abdominal wall. According to this example, said connection interface 6 comprises at least one portion having a Young's modulus between 1 and 35 MPa.

The advantage of said connection interface 6 is to reproduce the trocar/incision interactions of the patient. In this way, during the manipulation of instruments, the user perceives sensory feedback similar to same felt during a real situation in surgery, in particular in minimally invasive surgery.

In one embodiment the elastic properties of the flexible material 62 of the connection interface 6 are isotropic. In one embodiment, the flexible material has an isotropy at least greater than 90%. Advantageously, said isotropic flexible material 62 makes it possible to reproduce the elastic properties of the skin.

In one alternative embodiment, the elastic properties of the flexible material 62 of the connection interface 6 are anisotropic. For example, the flexible material 62 of the connection interface 6 may comprise fibres oriented in the same direction creating a material wherein the Young's modulus is greater in the parallel direction than in the direction perpendicular to the fibre. The fibres may constitute the connection interface 6 or be included within a matrix forming a composite material.

Advantageously, said anisotropic flexible material 62 makes it possible to reproduce a fibrous layer of the skin. Thus, the device according to the present invention is capable of simulating an incision on any portion of the human body.

In one embodiment, the at least one opening 4 is designed for receiving and maintaining a connection interface 6. Once maintained, the connection interface 6 is designed for receiving and supporting a sheath 7.

In one embodiment, the enclosure 2 also comprises at least one guiding interface. In one embodiment, the guiding interface is arranged close to at least one of the openings 4.

In one embodiment, said guiding interface provides a ball joint connection between the enclosure 2 and a surgical tool inserted into said opening of the enclosure 4. In one embodiment, the guiding interface provides a ball joint connection between the enclosure 2 and a sheath 7 inserted into said opening 4.

By "ball joint connection", reference is made here to the fact that the guiding interface performs an engagement between the enclosure 2 and a surgical tool/sheath 7, said engagement having three degrees of freedom in rotation.

In one embodiment, illustrated by way of non-limiting example in FIG. 2A, the connection interface 6 is also the guiding interface. In said embodiment, the interaction between the connection interface 6 and the sheath 7 makes it possible to reproduce in an optimised manner the interaction between a trocar and an incision performed on the patient during a surgical procedure.

Advantageously, said connection between the connection interface 6 and the sheath 7 shows the connection between the biological tissues of the area of insertion of the trocar and the trocar.

As illustrated in FIG. 2A, the connection interface 6 has a substantially cylindrical annular shape securely maintained with the edge of the opening 4. Such a geometric configuration of the connection interface 6 favours the production of the ball joint connection between the enclosure 2 and a surgical tool/sheath 7 which is inserted therein. Nevertheless, it should be noted that the choice of a specific shape of the connection interface 6 only constitutes one alternative embodiment of the invention. Thus, nothing excludes, on one hand, having other shapes, and on the other hand, that certain degrees of freedom in rotation are limited in the respective amplitudes thereof, as is for example described in more detail hereafter in relation with the embodiments illustrated in FIG. 2B and FIG. 2C.

In one embodiment, the guiding interface provides a connection between the enclosure 2 and the longitudinal portion of a sheath 7 or of a surgical tool 8. According to one example, said connection comprises two degrees of freedom in rotation. According to said example, a degree of connection in rotation is defined along the longitudinal axis of the longitudinal portion 71 of the sheath 7.

In one embodiment, the longitudinal portion 71 of the sheath 7 comprises an outer surface including on at least one of the portions thereof a surface state suitable for limiting the sliding with the connection interface 6. In one embodiment, the longitudinal portion 71 of the sheath 7 comprises an outer surface 73 comprising a surface state predefined for limiting the sliding with the connection interface 6. In one embodiment, said surface state is suitable for blocking the sliding in rotation about the longitudinal axis thereof of the sheath in the opening 4.

In one embodiment, said guiding interface makes it possible for the sheath 7, once inserted into the opening 4, to have 3 degrees of freedom in rotation. In practice, the sheath 7 may also keep at least one degree of freedom in translation corresponding to an insertion and removal movement. In one embodiment, the flared portion 72 of the sheath makes it possible to block the translation of the sheath when same is pushed in by a predefined distance. Therefore, the flared portion makes it possible to limit in one direction said degree of freedom in translation. In one embodiment, the flared portion also makes it possible to facilitate the introduction of the surgical tool into the sheath 7.

In one embodiment, at least two degrees of freedom in rotation are limited angularly. In one embodiment, the degrees of freedom in rotation along the axes orthogonal to the central axis of insertion A are limited angularly. Indeed, the inclination of the sheath 7 in relation to the first surface 9 is limited angularly so as to reproduce the freedom of the trocar inserted into an incision.

In one embodiment, the ball joint connection of the sheath in the guiding interface is limited to a rotation of 90°, 45° or preferably of 30°.

In one embodiment, the flexible material 62 of the connection interface enables a limited rotation of a sheath 7 along the two axes orthogonal to the central axis of insertion A of the connection interface 6. In one embodiment, the flexible material 62 is capable of being compressed for enabling the rotation of the sheath. The angular limit of the degrees of freedom in rotation is thus dictated by the compressibility limit of the flexible material 62.

In one embodiment, the rotation of the sheath 7 is limited by the thickness (E) of the flexible material 62 and/or by the elasticity of said flexible material 62 of the connection interface 6. In one embodiment, the thickness (E) of the flexible material 62 varies between 0.5 and 15 cm. The thickness guarantees the degrees of freedom.

The thickness (E) of the flexible material 62, the elasticity thereof, and the height (H) of the connection interface 6 are determined for reproducing the mechanical resistance of the skin or of the abdominal wall.

The advantage of a removable connection interface is therefore to be able, on the same opening, to modify the connection interface and therefore the height and the mechanical properties of the first surface 9/sheath 7 connection. Thus, the same device 1 makes it possible to multiply the use variants: same not only makes it possible to vary the portions of the body or the types of wall incised but also may take into account the variability of the individuals.

As illustrated in FIG. 3A and FIG. 3B, the advantage of said connection interface 6 is to carry out the connection between the enclosure 2 and a sheath 7.

In one embodiment, the sheath 7 makes it possible to simulate the presence of a trocar. In one embodiment, the sheath 7 is presented in the form of a hollow cylindrical shaft. In one embodiment, the sheath 7 comprises a first longitudinal portion 71 configured to be inserted into the opening 4. In one embodiment, the first longitudinal portion 71 comprises a hollow cylinder. In one embodiment, the first longitudinal portion 71 comprises an external diameter and an internal diameter. In one embodiment, the first longitudinal portion 71 is intended to receive at least one surgical tool.

In one embodiment, the sheath 7 comprises a second flared portion 72 whereof the internal diameter is greater than the internal diameter of the first longitudinal portion 71. The sheath is advantageously configured to be inserted into the opening 4 through the longitudinal portion 71 thereof so that the flared portion 72 is located on the outside of the enclosure 2. Thus, said flared portion 72 is configured to introduce the longitudinal portion of a surgical tool.

In one embodiment, the sheath 7 comprises a means for adjusting the diameter (not shown) of the longitudinal portion 71 thereof. Said means for adjusting the diameter of the longitudinal portion 71 of the sheath 7 makes it possible to vary said diameter depending on the surgical tool or depending on the diameter of the shaft of the surgical tool used for the training.

In one embodiment, the sheath 7 is a trocar or a reproduction of a trocar such as same used during surgical operations.

In one embodiment illustrated in FIG. 10, the first surface 9 comprises a set of openings 4 comprising at least two openings 4. In one embodiment, the first surface 9 comprises a plurality of openings, for example 3, 4, 5, 6, 7, 8, 9 or at least 10 openings 4. In one embodiment, the openings 4 are located on the first surface 9 so as to correspond to the location of the incisions performed in micro-invasive surgery of the abdomen, for example in visceral or bariatric surgery.

Depending on the type of operation and the surgical technique simulated, a portion of said openings 4 can be used. In one embodiment not shown, the device comprises a predefined number of plugs in order to plug the openings 4 that would not be used during the training.

Thus, the device 1 makes possible the training with various types of surgical procedures due to the position and the orientation of the openings.

In one embodiment, the device 1 comprises means for adjusting the diameter or the size of at least one opening 4. Said means for adjusting the diameter or the size of the openings make it possible to vary the size or the diameter of the openings. For example, the device 1 may comprise a diaphragm or iris whereof the centre corresponds to the centre of the opening. In one embodiment, said diaphragm or said iris may be connected to activation means configured to cause the reduction or the enlargement of the diameter of the opening 4.

In this way the diameter or the size of the opening 4 is variable and the opening 4 may thus be intended for a wide variety of diameter of sheath 7 and/or for a wide variety of connection interfaces 6. The advantage is to be capable, with the same device 1, of practicing on various types of operation requiring in reality trocars of different sizes.

In one embodiment, the device 1 comprises at least two openings 4 of different dimensions. Said layout makes it possible to simulate various surgical operations on the same device 1. Indeed, according to the surgical procedure simulated, the incisions may be of various lengths. For example, the incisions performed via the abdominal wall will have dimensions greater than the same incision performed for a vascular operation. The invention makes it possible to provide a realistic support to the user so that same practices for performing a procedure.

In one embodiment, the device 1 comprises a plurality of openings 4 of which, at least two openings 4 comprise different connection interfaces 6. "Different connection interfaces" means connection interfaces 6 whereof the height, the elasticity of the flexible material and/or the thickness of the flexible material differ from one another. Thus, the device 1 comprises a plurality openings 4 each capable of reproducing incisions in various portions of the body, for example an incision in the skin or an incision in the abdominal wall.

The device 1 is thus compatible for the simulation of diverse surgical operations.

In one embodiment, the device 1 further comprises a system for attaching 3 said device 1 to a support. The attachment system may comprise tightening means. In one embodiment, the attachment system 3 comprises a U-shaped lug for engaging with an edge of a table. According to a first example, the attachment system 3 comprises an attachment system by vice. According to a second example, the attachment system 3 is a suction pad.

In one embodiment, the device 1 also comprises means for adjusting the position 5 of the attachment system 3 in relation to said device 1.

For example, the attachment system 3 may comprise a longitudinal element 31. In one embodiment, the device 1 comprises a position adjustment means 5 configured to slide along the longitudinal element 31. As illustrated in FIG. 1A, the position adjustment means 5 comprises a removable element 51 intended to be inserted into bores of the longitudinal element 31 of the attachment system 3 so as to attach the position of the enclosure 2 opposite the attachment system 3.

More specifically, the means for adjusting the position 5 comprises an integral portion of the enclosure 2 enabling a translation of the enclosure along the longitudinal element 31 that is a removable element.

In one embodiment illustrated in FIG. 1B, the device 1 also comprises a means for adjusting the inclination of the enclosure 2. The means for adjusting the position 5 is the means for adjusting the inclination of the enclosure 2. In one embodiment, the means for adjusting the orientation enables the adjustment of the inclination of the enclosure 2 at the connection with the longitudinal element 31.

Advantageously, the means for adjusting the position 5, makes it possible to move the enclosure 2 so that the openings can correspond to an ergonomic position for the user. Preferably, the user will adjust the position of the enclosure 2 so that the opening 4 is substantially on the same vertical level as the hands of the user when the arms thereof are lowered or in a non-tiring position.

Thus, the means for adjusting the position 5 is configured to be suitable for a plurality of users. In addition, the adjustment of the position 5 makes possible the mobility of the device that may thus be used on any support.

In one embodiment, the enclosure 2 comprises a position and orientation location system.

In one embodiment, the enclosure 2 comprises a detector for identifying the presence of a connection interface 6 in an opening 4. The detector also makes it possible to identify the parameters of the connection interface 6 such as for example, the height thereof, the elasticity of the flexible material 62 or the thickness of the flexible material 62.

In one embodiment where the enclosure 2 delimits a closed volume, the enclosure 2 is filled with air. In another embodiment, for the simulation of certain surgical procedures, the enclosure 2 is filled with a material, preferably with a soft or viscous material, or with a liquid. The presence of a viscous material or of a liquid makes it possible to simulate a resistance to the movement of the at least one shaft 81 of a surgical tool 8 moving in the enclosure 2. In one embodiment, the viscosity of the material or of the liquid comprised in the enclosure 2 is greater than $4.10^{-3}$ Pa·s. In one embodiment, the modulus of elasticity of the material comprised in the enclosure 2 is greater than 0.002 MPa. Said various viscoelasticities make it possible to simulate a movement of the surgical tool 8 in the body, for example in a volume enclosing blood, in a muscle or even an organ.

Figure 4:
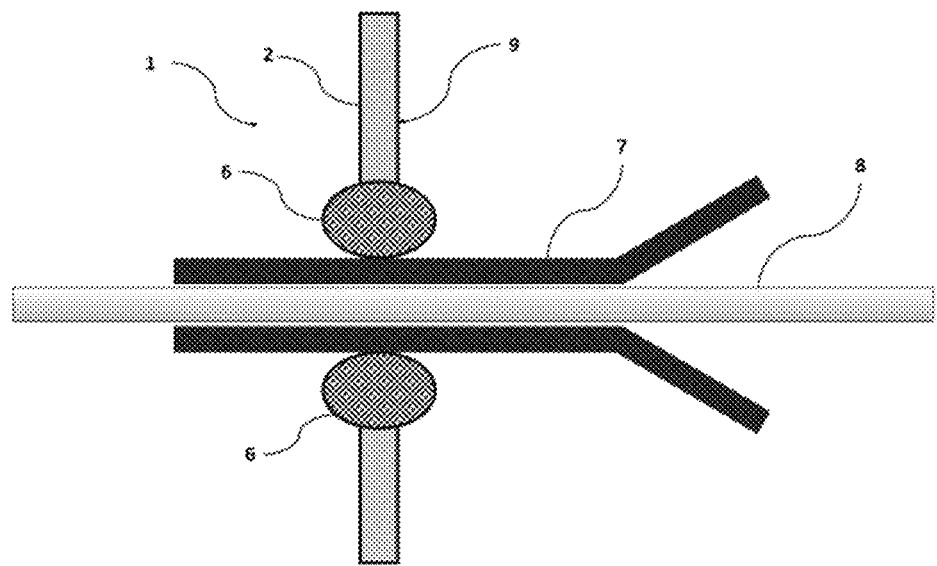
FIG. 4 is a sectional view of an opening and of a sheath wherein is inserted a shaft of a surgical tool.
Figure 5:
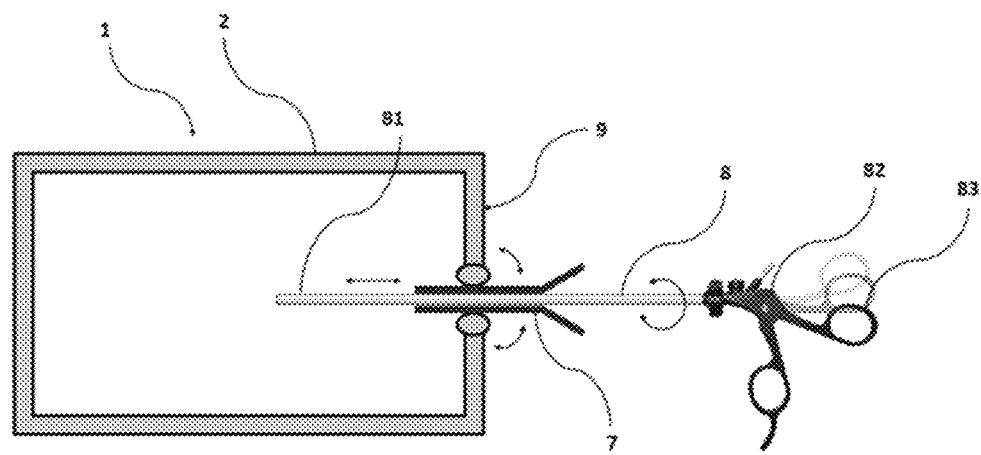
FIG. 5 is a sectional view of a training device. A sheath is inserted into an opening of the device and the shaft of a surgical tool is inserted into said sheath.

In one embodiment illustrated in FIG. 4, and FIG. 5, the sheath 7 is intended to receive the shaft 81 of a surgical tool 8.

The sheath 7 whereof the hollow and longitudinal portion 71 is maintained in one of the openings 4 makes it possible to receive a surgical tool 8.

"Surgical tool" means here any surgical tool comprising a longitudinal portion 81 (also called "shaft" later) configured to be inserted into the body of a patient as well as a lever 82 intended to be manipulated by the surgeon during the operation. "Surgical tool" also means any reproduction of such a tool, such as for example, a tool reproduced by 3D printing.

In one embodiment, "a surgical tool" also encompasses an imaging system for recording images of the inside of the body of the patient during a surgical procedure such as an endoscopic camera or an arthroscopic camera.

In one embodiment, the sheath 7 and the shaft 81 of the surgical tool 8 form a sliding pivot connection. In one embodiment illustrated in FIG. 5, the connection formed by the shaft 81 and the sheath 7 as well as the connection formed by the sheath 7 and the guiding interface are combined to form, between the shaft 81 and the enclosure 2, a connection comprising 3 degrees of freedom in rotation and one degree of freedom in translation.

In one embodiment, over the three degrees of freedom in rotation of the shaft 81, same along the central axis of insertion A or along the longitudinal axis of the shaft 81 is totally free. In one embodiment, 1 or 2 degrees of freedom in rotation are limited angularly so as to reproduce the freedom of movement of a surgical tool during an operation. In one embodiment, the degrees of freedom in rotation limited angularly are the degrees of freedom in rotation along the axes orthogonal to the central axis of insertion A.

In one embodiment, the internal diameter of the longitudinal portion 71 of the sheath 7 is slightly greater than or equal to the external diameter of the shaft 81 of the surgical tool 8.

Figure 7:
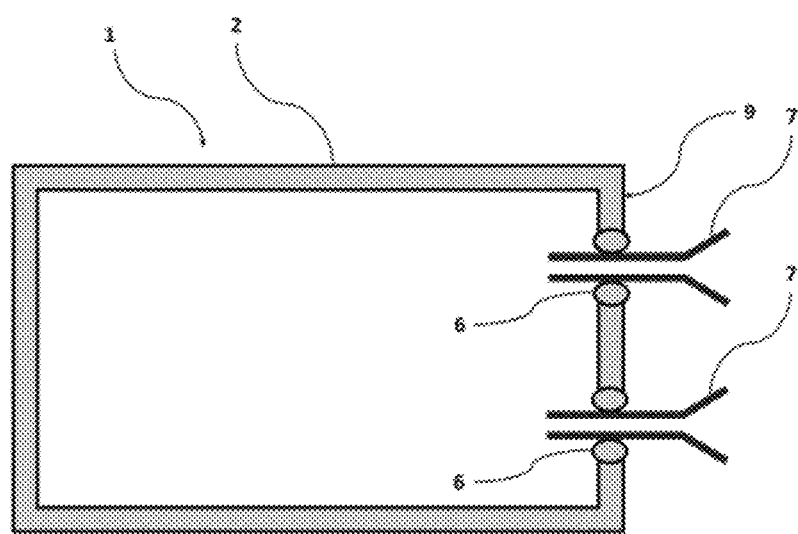
FIG. 7 is a sectional view of a training device comprising two openings, a sheath being inserted into each of the openings.

In one embodiment illustrated in FIG. 7, the enclosure 2 comprises at least 2 openings 4 arranged on the first surface 9. In one embodiment, the at least two openings 4 each comprise a connection interface 6. In one embodiment, the at least two openings 4 are suitable for each receiving a sheath 7.

The remainder of the description aims to describe in detail one embodiment of the invention, wherein the first surface 9 includes a moveable portion 10 in relation to the base 21, the opening 4 being arranged on said moveable portion 10. Such a configuration of said first surface 9 makes it possible to modify the placement of the opening 4 positioned on the moveable portion 10 in relation to the base 21. In this way it is possible to reproduce in an optimised manner the position of incisions intended to be made in connection with the surgical procedure concerned. Thus, it is possible to practice on a plurality of surgical procedures with the same device 1, whilst reproducing in an optimised manner the real conditions by means of the connection interface 6. It is also possible to adapt the device 1 to the morphology of each patient.

By "moveable", reference is made here to a relative movement in relation to the base 21 considered as being attached, so as to modify the distance between said base 21 and said moveable portion 10. Thus, a moveable portion 10 of the first surface 9 corresponds to a surface element suitable for being moved, by a user or even automated means known per se, between a first position, so-called departure position, and a second position, so-called arrival position. It will become implicitly apparent to the person skilled in the art, in view of the nature of the invention, that said positions respectively of departure and arrival correspond to stable positions, that is to say positions wherein the moveable portion 10 is maintained. In other words, the device 1 is provided with means for blocking in stable position the moveable portion 10. In general, any blocking means known by the person skilled in the art may be implemented (brake, stop, etc.), the choice of a blocking means only constituting one alternative embodiment of the invention.

Figure 8:
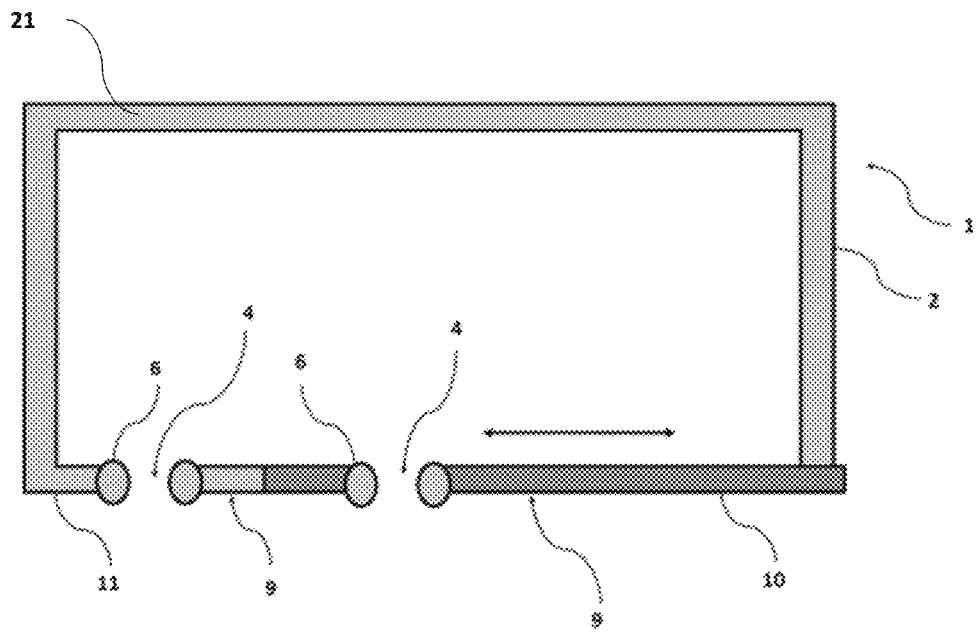
FIG. 8 and FIG. 9 are a sectional view of a device comprising means for adjusting the distance between two openings.
Figure 9:
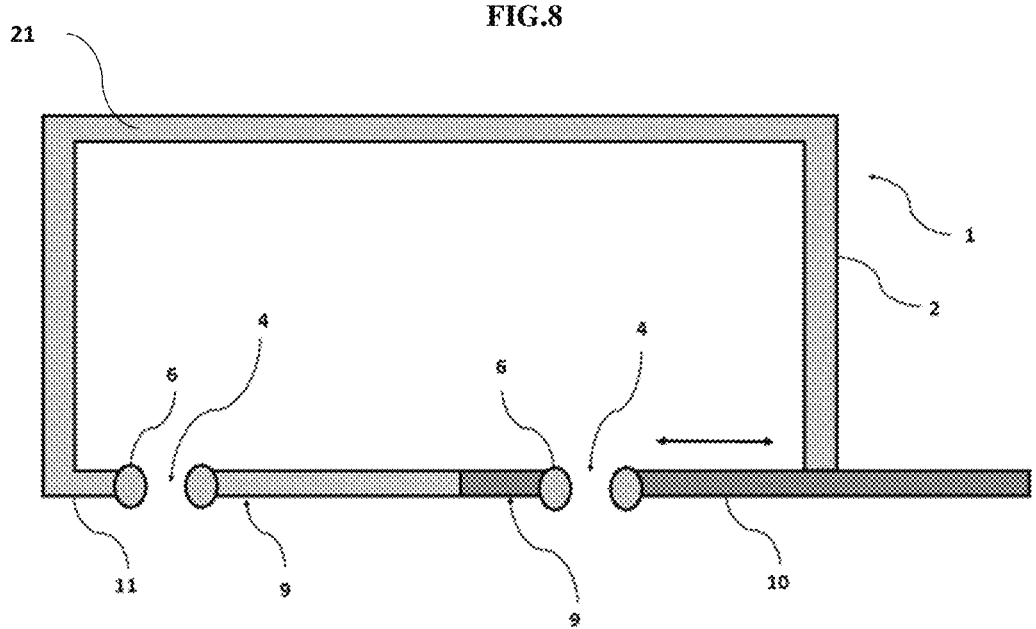

FIG. 8 and FIG. 9 schematically illustrate preferred examples of embodiment of the enclosure 2, wherein two openings are made in the first surface 9, said latter being configured so that the gap between said two openings is adjustable depending on the surgical procedure on which a member of the medical staff desires to practice.

As illustrated in FIG. 8 and FIG. 9, the first surface 9 includes another opening 4 arranged on another portion of the first surface 9, separate from said moveable portion 10. Said openings 4 are suitable for receiving and supporting a sheath 7 such as previously described.

Such a configuration of said first surface 9 makes it possible to modify the placement of the two openings 4, one in relation to the other, therefore to vary the gap that separates same. Thus, it is possible to reproduce in an optimised manner the position of a plurality of incisions intended to be made in connection with the surgical procedure concerned. In this way, the medical staff that desires to be trained is able to practice on a plurality of surgical procedures with a single and same device, whilst reproducing in an optimised manner the real conditions.

In the examples illustrated in FIG. 8 and FIG. 9, said other portion 11 is integral with the base 21. By "integral", reference is made here to the fact that said other portion 11 remains attached in relation to the base 21. In said example of embodiment, said integral portion 11 is formed by an extension of the base 21, said extension coming from material with said base 21. Thus, according to said configuration, the modification of the gap between two openings 4 results from a modification of position of the single moveable portion 10, the other portion remaining attached in relation to the base 21. Such layouts make it possible to obtain a device 1 of simple design requiring few manipulations to be adapted to a given surgical procedure.

It should be noted that nothing excludes having a portion 11 integral with the base 21 without in as much coming from material with same. In general, any means for maintaining in attached position the other portion 11 is possible, the choice of a maintenance means only constituting one alternative embodiment of the invention. The person skilled in the art will know how to choose such a maintenance means (welding, bonding, etc.), said aspect of the invention not being consequently described in detail above.

In one alternative embodiment (not shown in the figures), said other portion 11 is also moveable in relation to the base 21. Thus, according to said configuration, each opening 4 is placed on a moveable portion, the moveable portions being separate from one another. Such layouts make it possible to increase the gap modification possibilities between two openings 4. Indeed, it happens that the device 1 is put into a congested environment, regardless of by the assistance staff standing in close proximity of said device 1 or even by other items of equipment necessary for the surgical procedure concerned. It is then understood that in said type of environment, the amplitude of the movements of a moveable portion 10 may be limited, to the extent that having two moveable portions is very advantageous for compensating the reduced amplitude of each of said moveable portions. This also contributes to the adaptability of the device 1 to various morphologies of patients.

In the examples of embodiment illustrated in FIG. 8 and FIG. 9, the moveable portion 10, is suitable for being moved according to a translational movement. To this end, the device includes a slide (not shown in the figures) configured in a manner known per se for engaging with said moveable portion 10. The use of such a slide makes it possible to provide a stable translational movement along a plane parallel to same wherein is extended the first surface 9. It will become clearly apparent to the person skilled in the art that the invention is not limited to the implementation of a single slide. For example, in order to further increase the stability of the translational movement, the device 1 may comprise two slides arranged opposite one another and configured to engage with two opposite sides of the moveable portion 10.

Furthermore, in the case where the first surface 9 includes two moveable portions, nothing excludes that each moveable portion engages with one or more slides that are specifically dedicated thereto, or even that the two moveable portions engage with common slides.

It should be noted that the invention cannot be reduced to one mode of movement of a specific type for a moveable portion 10, such as for example a translational movement as described above. Thus, nothing excludes for example having a moveable portion 10 according to a substantially circular arc movement by means of a lever arm configure to this end (for example a lever arm whereof an end is rotationally moveable and another opposite end is securely engaged with a moveable portion), or even having a moveable portion 10 in rotation by means of one or more hinges. Nothing also excludes that when the first surface 9 includes a plurality of moveable portions, the respective movements of said moveable portions differ from one another.

Moreover, the invention has been described up to present with at most two moveable portions. Nevertheless, the number of moveable portions cannot be limited to two at most. More specifically, the number of moveable portions is at most equal to the number of openings 4 made in the first surface 9. Yet, the maximum number of openings 4 is adapted depending on the range of surgical procedures whereon the medical staff may be trained for a same device 1. By way of non-limiting example, the number of openings is equal to 5, and the number of moveable portions is between 0 and 5, for example equal to 2.

According to another aspect, the invention consists of a guiding system for the training of a surgical procedure. In one embodiment, said system comprises a training device 1, at least one first sheath 7 comprising a hollow and longitudinal portion 71 introduced into and maintained in one of the openings 4 of said training device 1. In one embodiment, the sheath 7 is suitable for receiving a shaft 81 of a surgical tool 8. In one embodiment, said first sheath 7 provides a sliding pivot connection for the movement of said surgical tool 8. In one embodiment, the surgical system comprises a second sheath 7 introduced into and maintained in one of the openings of the training device 1.

In one embodiment, the guiding system also comprises at least one surgical tool 8 such as described above.

Figure 6:
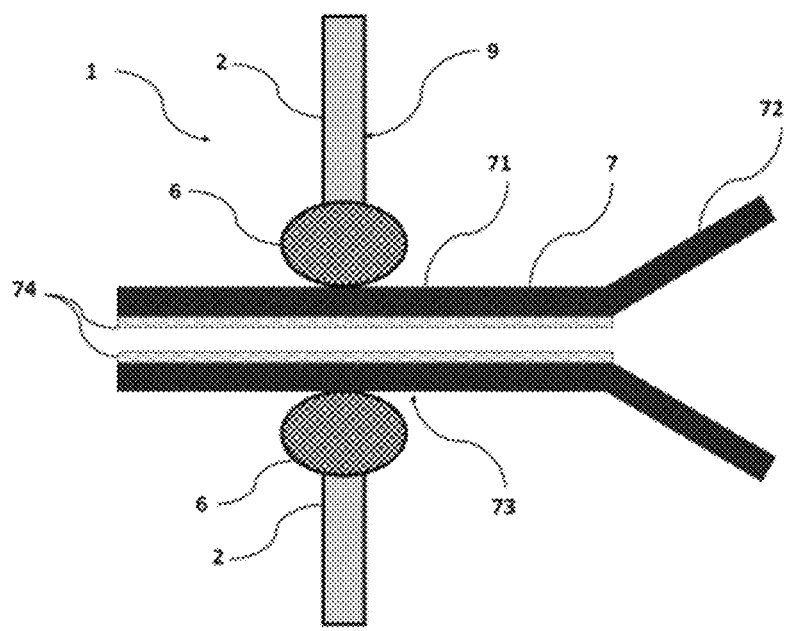
FIG. 6 is a sectional view of a sheath comprising an elastic material layer.

In one alternative embodiment illustrated in FIG. 6, the longitudinal portion 71 of the sheath 7 also comprises an elastic material layer 74. Said elastic material layer 74 is configured to be deformed by an object located in the central hollow portion of the longitudinal portion 71 of the sheath 7.

In one embodiment, said elastic material layer 74 is placed on the inner surface of the longitudinal portion 71 of the sheath 7. In one embodiment, said layer 74 is attached to the inner surface of the sheath 7. The attachment may be carried out by bonding or thermobonding.

In said embodiment, said elastic material layer 74 is configured to be deformed in compression during the passage of a shaft 81. In one embodiment, the external diameter of the shaft 81 is greater than the internal diameter of the longitudinal portion 71 of the sheath 7. In one embodiment, once the shaft 81 inserted into the sheath 7, the elastic material layer 74 will tend to revert back to the original shape thereof, thus nullifying the difference between the internal diameter of the sheath 7 and the external diameter of the shaft 81.

In one embodiment, the internal diameter of the longitudinal portion 71 of the sheath 7 varies between a first diameter where the elastic material layer 74 is in the "at rest" shape and a second diameter where the elastic material layer 74 is compressed to the maximum of the elasticity thereof. In one embodiment, the external diameter of the shaft is between said first diameter and said second diameter.

In this way, advantageously the appearance of a gap between the shaft 81 and the walls of the sheath 7 is prevented. Furthermore, this also makes it possible to use surgical tools 8 comprising shafts 81 of various diameters on the same sheath 7. Said latter possibility makes it possible to obtain optimised configuration relative to diverse situations of operating procedures. Thus, the same sheath 7 can be used for the training and the simulation of use of various surgical tools and therefore for the simulation of various surgical procedures.

In one alternative embodiment not shown, the elastic material layer 74 comprises a first portion at the first longitudinal end of the longitudinal portion 71 of the sheath 7 and a second portion located at the second longitudinal end of the longitudinal portion 71 of the sheath 7. Said mode makes it possible to reduce the quantity of material used and lighten the sheath.

In one embodiment, the first portion and the second portion have a section whereof the geometry is non-circular so as to facilitate the deformation of the elastic material layer 74 during the passage of the shaft 82. In one embodiment, the first portion and the second portion each have a star-shaped section.

In one embodiment, said elastic material layer 74 comprises a surface sufficiently smooth for providing a sliding pivot connection with a shaft inserted into the sheath 7.

In one embodiment, the lever 82 of the surgical tool 8 comprises at least one control interface 83. Said control interface may be a switch, a pushbutton, scissors or any actuation means.

During a real intervention, said control interface makes it possible to activate a function at the distal end of the surgical tool, for example to activate pliers. In one embodiment, said control interface 83 will make it possible to reproduce in the virtual world an activation of the distal end of the surgical tool and also to reproduce the state of the control interface 83.

In one embodiment, the surgical tool 8 comprises at least one sensor of the activation of the control interface 83. In one embodiment, said sensor of the activation of the control interface 83 generates a control indicator.

In one embodiment not shown, the shaft 82 comprises a functional portion that can be activated by the control interface 83. In one embodiment, the surgical tool 8 comprises a sensor of the actuation of the functional portion. According to a non-limiting example, the functional portion is pliers that can be actuated via the control interface 83 and the sensor of the actuation measures the opening angle of the pliers or the distance between two jaws of said pliers. In one embodiment said sensor of the actuation generates a control indicator.

In one embodiment, the functional portion is located close to or on the distal end of the shaft 82.

The control indicator may therefore be generated either from the control interface 83 or by the position or the state of the functional portion of the surgical tool 8.

As illustrated in FIG. 5, the control interface 83 may be a moveable portion configured to be moved easily by the user, for example from a finger of the user. In one embodiment, the sensor of the activation of the control interface 83 generates an indicator that may be the percentage of movement or a movement in relation to a reference.

Thus, the user practices on a lever 82 similar to same used during a real surgical operation. In addition, said sensor may make it possible during a simulation, to generate an image whereon is simulated the activation of the functional portion of the shaft when the user activates the control interface 83, for example to open or close pliers proportionally to the value of the indicator generated.

In one embodiment, the surgical tool 8 comprises at least one position sensor. In one embodiment, the surgical tool 8 comprises at least one positioning sensor and/or at least one orientation sensor.

In one embodiment, the surgical tool 8 comprises at least one communication interface for transmitting the data collected by the sensors of the surgical tool 8 to a remote computer. In one embodiment, said communication interface may be wireless or wired. In one embodiment, said communication interface also makes it possible to transmit the data of the at least one sensor of the activation of the control interface 83 or of the at least one sensor of the actuation of the functional portion of the surgical tool 8.

In one embodiment, the surgical tool 8 comprises at least one haptic feedback means. In one embodiment, said haptic feedback means is a vibrator or a transducer. Said haptic feedback means makes it possible, when a simulation detects a contact between the surgical tool and an object simulated in the virtual world, to make the user feel said contact.

In one embodiment, the guiding system also comprises means for simulating a surgical procedure in a virtual world. In one embodiment a display device generates in real time a simulation of a surgical procedure comprising a portion of a body of a patient and the simulation of at least one shaft of a surgical tool manipulated by a user.

Through the display device, the user sees a simulation of the portion of a human body to be operated on in the virtual world as well as a representation of the movement of the surgical tools that same manipulates.

In one embodiment, the computer is configured to simulate an interaction between the at least one surgical tool and the body of the patient. In one embodiment the computer is configured to transmit information to the haptic feedback means of the surgical tool 8. In one embodiment, the computer is configured to transmit information or activate the haptic feedback means to make the user feel an event, for example, when the surgical tool touches the body of the patient in the virtual world.

In one embodiment, the guiding system comprises a generator of an image of the area of a body of a patient on a display. In one embodiment, the generator comprises a computer for receiving the data transmitted by the sensors of the surgical tool and/or by the control interface. In one embodiment, the generator comprises a computer for receiving the data transmitted by the surgical tool and for transmitting information to said surgical tool 8.

In one embodiment, the computer is configured to:
  determine the value of the control indicator; and/or
  determine positions and orientations of surgical tools to be displayed on a display from data received by the sensors arranged on the surgical tool.

In one embodiment, the generator, from data received from said sensors of the surgical tool 8, generates a first image comprising a visual representation of at least one surgical tool. The visual representation of said latter tool may, for example, be superimposed on the representation of an area of a body or on same of an organ and the environment thereof.

In one embodiment, the position of the surgical tool is calculated in real time. Thus, the first generated image makes it possible to simulate the position of the distal portion of the surgical tool in the body of a virtual patient. In one embodiment, the first generated image comprises the functional portion of the surgical tool as well as the activation state thereof.

Advantageously, said first image simulates an image taken by a camera introduced into the body of the patient during the operation and displayed on a screen in the operating room to guide the movements of the surgeon.

In one embodiment, the generated image is transmitted to a video display.

In one embodiment, the generator generates a second image. In one embodiment, said second generated image comprises the first generated image. In one embodiment, the second generated image is a simulation of the view of the surgeon during an operation. According to one example, said simulation of the view of the surgeon comprises a screen comprising the first generated image.

In one embodiment, the second generated image comprises a visual representation of at least one surgical tool manipulated by the user. In one embodiment, the at least one surgical tool 8 is shown identically in the virtual world. In one embodiment, the surgical tool is shown identically in the visual representation of the second generated image. In one embodiment, the position, the orientation of the surgical tool 8 are shown in the second generated image. In one embodiment, the state or the arrangement of the control interface 83 is shown in the second generated image.

Thus, the user may advantageously look at in the second generated image the position of the tool thereof in relation to the body of the patient and if the control interface has been activated or not. In one embodiment, the second image comprises an abdomen of the patient. In one embodiment, the generator is connected to the position and orientation location system of the enclosure 2. In one embodiment, the second image is generated from data received by said location system. Thus, the position and the orientation of the enclosure 2 is reproduced in the virtual world to simulate, for example the abdomen of the patient. In addition, the second generated image may comprise trocars inserted into incisions of the patient. The trocars shown corresponding to the sheaths 7 of the guiding system.

In one embodiment, the shape of the abdomen of the second image corresponds to the shape of the enclosure 2 or corresponds to the shape of the first surface 9.

In one embodiment, the second generated image comprises the patient.

In one embodiment, the computer is configured to interpret the data coming from the sensors of the lever of the surgical tool for determining the position and the orientation of said surgical tool in the space and/or the activation of the functional portion thereof and/or the lever thereof.

In one embodiment, the guiding system therefore comprises a video display displaying a reproduction of a portion of at least one surgical tool and of a movement relative to the activation thereof when the control indicator is generated.

In one embodiment, the video display is configured to display the first generated image by the generator or the second generated image by the generator.

In one embodiment, the video display also displays a reproduction of an area of a body of a patient.

In one embodiment, the video display is a screen.

In one embodiment, the video display is a virtual reality headset.

Figure 11:
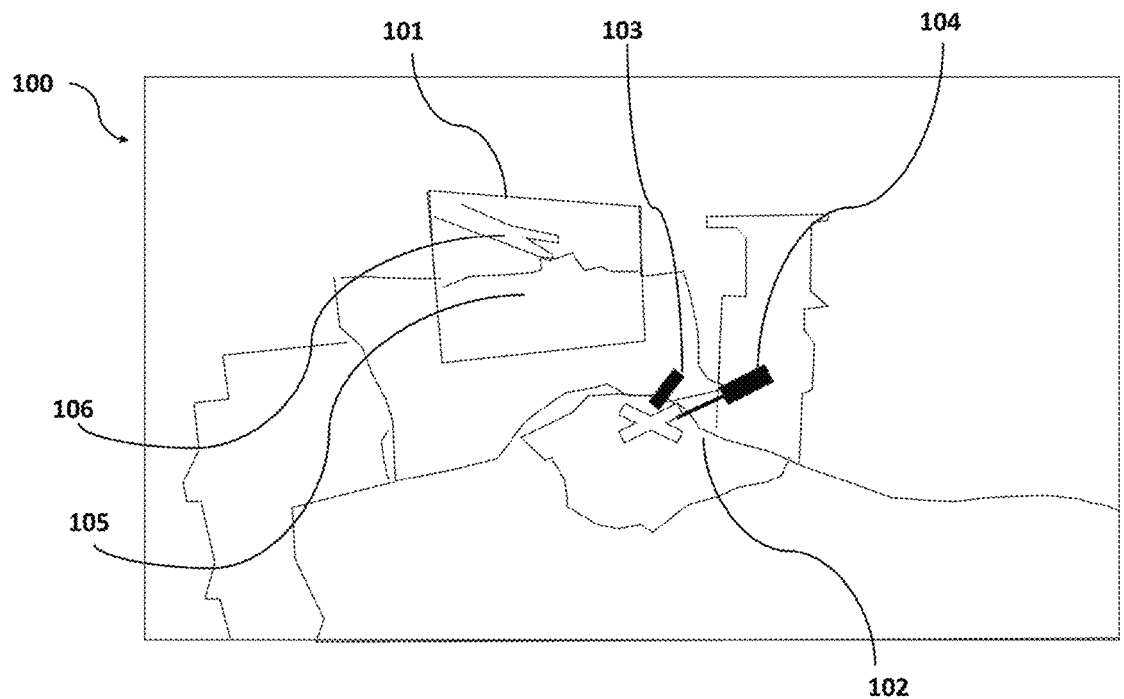
FIG. 11 shows an example of an image generated by the guiding system.

In one embodiment illustrated in FIG. 11, the second generated image 100 comprises the representation of the area of the patient to be operated on 102, at least one trocar 103 inserted into an incision of the patient, at least one surgical tool 104 inserted into said trocar 103.

The second generated image also comprises the first generated image 101. In one embodiment, said first image 101 is shown in the second image 100 in a screen. Said first generated image comprises at least one area of a body of a patient 105 (here an organ) and the environment thereof. The first generated image also comprises at least one portion of the surgical tool (here the distal end of the surgical tool) 106 and/or the functional portion thereof (here pliers) that can be activated by the control interface 83 of the surgical tool 8.

According to another aspect, the invention relates to a system intended to train persons to perform a minimally invasive surgical procedure; comprising:
  a training device according to the present invention;
  at least one sheath and at least one surgical tool according to the present invention;
  a video display means;
  a video imaging system intended to produce a video image simulation of said tool of the device superimposed on a visual representation of an organ of the patient and of the environment thereof;
  a processor configured to interpret the data coming from the sensors of the lever of said device for determining the position and the orientation of the instrument; said processor also controlling the video imaging system to create a visual simulation for said display means.

More generally, it should be noted that the embodiments considered above have been described by way of non-limiting example, and that other alternatives are consequently possible.

Notably, the invention has been described by considering a system intended to train persons, said system notably being equipped with a video imaging system favouring the visual assistance of the person carrying out the manipulations. Nothing excludes, according to other examples, considering a system intended for the training wherein the training device includes a first surface produced in a transparent material, or even in that the whole enclosure is produced in such a transparent material. In such cases, the transparent material also forms a visual assistance aid if the person carrying out the manipulations acquires a direct visual perception of the movements thereof. Of course, the use of such a transparent material is compatible with a video imaging system so as to have an optimum visual assistance.

The invention claimed is:

1. A training device for performing a surgical procedure, said device being configured to enable a user to perform a plurality of various surgical procedures, and comprising:
  an enclosure including:
    a first surface defining an operation interface intended to receive at least one surgical tool, the remainder of the surface of the enclosure forming a base, the first surface and the base being attached to each other;
    a first opening arranged on said first surface;
    a second opening also arranged on said first surface; and
    a connection interface maintained at the circumference of said first opening;
  said connection interface being suitable for receiving and supporting a sheath; and
  wherein the first surface includes a manually moveable portion in relation to the base, said first opening being arranged on said moveable portion;
  wherein the second opening is arranged on a second portion of the first surface separate from the moveable portion, in order to enable a modification of a placement of the first opening and a placement of the second opening in relation to each other based on manual manipulation of the at least one surgical tool positioned in the first opening by a hand of the user, to vary a gap that separates the first opening to the second opening;

wherein the moveable portion is configured to be manually moved from a stable departure position towards a stable arrival position; and wherein the training device further comprises means configured for blocking the moveable portion in both the stable departure position and the stable arrival position.

2. The device according to claim 1, wherein said second portion is integral with the base.

3. The device according to claim 1, wherein said second portion is moveable in relation with the base based on manual manipulation of the at least one surgical tool positioned in the second opening by a hand of the user.

4. The device according to claim 1, wherein said connection interface comprises an elastomer, a foam, a silicone gel or a plastic material whereof the Young's modulus is between 0.002 MPa and 50 MPa.

5. The device according to claim 1, wherein the enclosure comprises at least one guiding interface arranged close to at least one opening, said guiding interface providing a ball joint connection with a longitudinal portion of a sheath.

6. The device according to claim 1, wherein the connection interface is removable.

7. The device according to claim 1, further comprising a system for attaching said device to a support; and a means for adjusting the position of said device of the attachment system.

8. A guiding system for the training of a surgical procedure comprising:

the device according to claim 1; and a first sheath including a hollow and longitudinal portion introduced into and maintained in one of the openings of said device and suitable for receiving a surgical tool, said first sheath providing a sliding pivot connection for the movement of said tool.

9. The guiding system according to claim 8, further comprising:

a second sheath including a hollow and longitudinal portion introduced into and maintained in the second opening of said device and suitable for receiving a surgical tool, said second sheath providing a sliding pivot connection for the movement of said tool.

10. The guiding system according to claim 8, wherein at least one sheath comprises an elastic material layer placed on the inner surface of the longitudinal portion of said sheath.

* * * * *